(12) United States Patent
Shen

(10) Patent No.: US 8,830,373 B2
(45) Date of Patent: Sep. 9, 2014

(54) IMAGING DEVICE HAVING MULTIPLE OPTICS

(75) Inventor: Ji Shen, San Diego, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 199 days.

(21) Appl. No.: 13/411,002

(22) Filed: Mar. 2, 2012

(65) Prior Publication Data

US 2013/0176483 A1    Jul. 11, 2013

Related U.S. Application Data

(63) Continuation-in-part of application No. 29/371,900, filed on Jan. 9, 2012.

(51) Int. Cl.
*H04N 5/222* (2006.01)

(52) U.S. Cl.
USPC ....... 348/333.01; 348/370; 348/372; 348/744

(58) Field of Classification Search
USPC ................. 348/333.1, 370–376, 744, 333.01, 348/370–76
See application file for complete search history.

(56) References Cited

U.S. PATENT DOCUMENTS

| | | | |
|---|---|---|---|
| 7,843,611 B2 * | 11/2010 | Albahri | 358/474 |
| 2003/0117670 A1 | 6/2003 | Brugger et al. | |
| 2010/0141780 A1 * | 6/2010 | Tan et al. | 348/222.1 |

* cited by examiner

Primary Examiner — Yogesh Aggarwal
(74) Attorney, Agent, or Firm — RatnerPrestia

(57) ABSTRACT

Disclosed is an imaging device that has a base and a plurality of image capture devices. The base includes a bottom portion and an elongate stem portion that is pivotally attached at one of its ends to the bottom portion. An arm is pivotally attached to the stem portion. The arm has an elongate flap pivotally attached to the arm's mid-portion. A plurality of image capture devices are embedded in at least one of the bottom portion, the stem portion, the arm and the flap. An additional embodiment of the image capturing system includes a housing, a light capture mechanism and an image display mechanism. The housing includes a base and a linkage having a plurality of elongate sections. The light capture mechanism simultaneously captures first and second images and is contained within at least one of the elongate sections. First and second lenses make up the light capturing mechanism.

5 Claims, 5 Drawing Sheets

IMAGING DEVICE HAVING MULTIPLE OPTICS

CROSS REFERENCE TO RELATED APPLICATIONS

This application is a continuation-in-part of and claims the benefit of U.S. Ser. No. 29/371,900 filed on Jan. 9, 2012, the contents of which are incorporated fully herein by reference.

TECHNICAL FIELD

The present disclosure generally relates to document cameras and to the field of document scanning apparatuses, and methods for both capturing real-time video with zooming capability and scanning high resolution still images of documents using the same apparatus.

BACKGROUND

There has never been an apparatus that can both scan a document and capture a second unrelated image and internally combine the document image with the unrelated image. There are times when it would be convenient to capture an image of an object as is done with traditional scanners and also capture an image of the person scanning the object. For example, a teacher in a distance learning situation who wishes to discuss an important document might want to scan the document and also project an image of herself to students at remote locations. The need thus exists for an apparatus that can capture both an image of a document (or even of a three-dimensional object) and an image of an unrelated object, i.e., an image of the teacher. There is also an existing need for a small form factor apparatus.

Manufacturers have attempted to produce small form factor document scanners for decades. Originally, scanners were bulky, space consuming devices. Ultimately, a desktop type scanner was deemed desirable. The desktop scanner would solve the size problems associated with the original scanners. However, the desktop scanner, no matter its size, would have been limited in the number of functions that could be accomplished. Further, the desktop scanner required a sheet transfer mechanism to intake and output sheets through the scanner. The more features that were added to a desktop scanner, the bulkier the scanner would become. Thus, there was no desire to add a feature such as a second imaging device as it would have unnecessarily added to the size and/or weight of the desktop scanner. There was never a need to image two subjects using the same device because the objective of the desktop scanner the maintenance of a small size; thus, only a single image capture device was ever employed in a desktop scanner.

At most, the desire to add a second image capture device would have been to increase processing speed of a scanning device. However, processing speed would more likely been increased by increasing the scanner's feeder mechanism speed. Adding a second camera would only have increased the size of the camera, thereby subtracting from the goal of a desktop scanner, which is to reduce its size. Certainly, no person ever would have added a camera for the purposes of capturing a non-document image.

SUMMARY

Disclosed is an imaging device that has an elongate base, an arm pivotally attached at one of its ends to an end of the elongate base, an elongate flap pivotally attached to the arm and a hand pivotally connected to the other end of the arm. The elongate flap can be configured to be retractable to a position within the arm to be hidden from view. A plurality of image capturing devices are embedded in the elongate base, the arm, the flap, the hand or a combination thereof The image capturing devices can be a lens, a laser reader, etc.

A display device, an internal non-transitory hard drive, a processor and a motion detection unit can be added to the device. The image display device can display images that are obtained from the image capturing devices, the hard drive, a remote source or any combination thereof Also, the image display device can be a touch sensitive display screen or a projector for emitting images onto a large surface. The motion sensing unit would be to wake up the device if it is equipped with a "sleep" power saving function. The imaging device is selectively operable with a PC and a Mac.

Extra features for the imaging device include a sound recording mechanism such as a microphone or other auditory pick up and a sound projection mechanism such as a speaker or a mechanism for visualizing sound such as a graphic equalizer. An optional light source can be provided to aid in illumination of the subject.

A further embodiment of the image capturing and projection system could include a housing having a base and a linkage having a plurality of elongate sections. A light capturing mechanism that simultaneously captures a first image and a second image can be used. The light detection mechanism can be contained within at least one of the plurality of elongate sections. An image display mechanism, which simultaneously displays the simultaneously captured images can be included. The images can be displayed separately and independently (i.e., via toggling) as well as simultaneously. These images can be a video stream displayed in real-time. Also, the images can be captured locally and displayed remotely.

DETAILED DESCRIPTION

Figure 1:
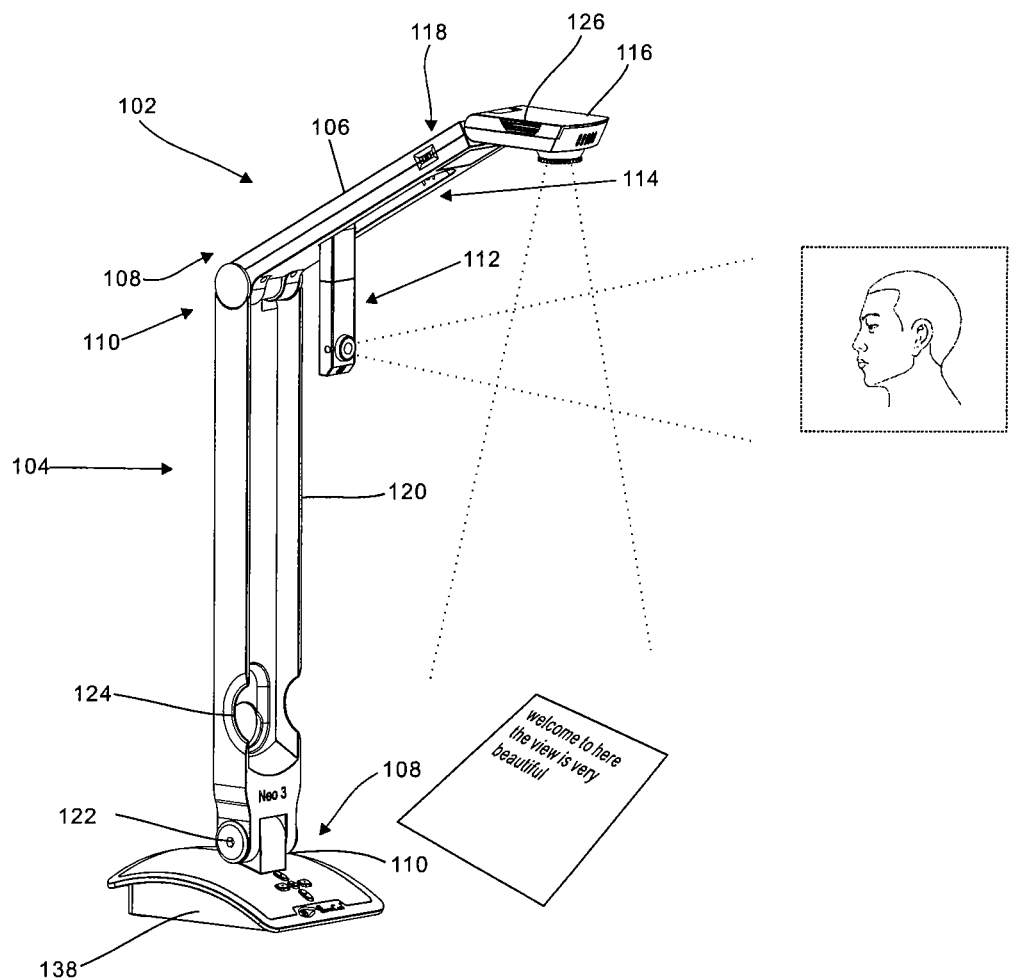
FIG. 1 shows an embodiment of the imaging device having multiple optics.

FIG. 1 shows an imaging device 102. The imaging device 102 has a base 104, an arm 106 pivotally attached at the arm's first end 108 to a first end 110 of the base 104. An elongate flap 112 is positioned at a midpoint 114 of the arm 106. A hand 116 is positioned on a second end 118 of the arm 106. The elongate flap 112 is retractable into a concealed position within the arm 106.

A stem 120 projects from a bottom portion 138 of the base 104. As an upper portion of the base 104, the stem 120 shown in the figures is provided with a joint 122 so that the stem 120 is articulable about the bottom portion 138. In this embodiment of the imaging device 102, the stem 120 is articulable about a single axis; however, a ball-and-socket joint, a universal joint or some other multi-degree-of freedom joint can be used to connect the stem 120 to the bottom portion 138. The stem 120 can also be made to be telescopic to increase or decrease the height thereof.

Figure 2:
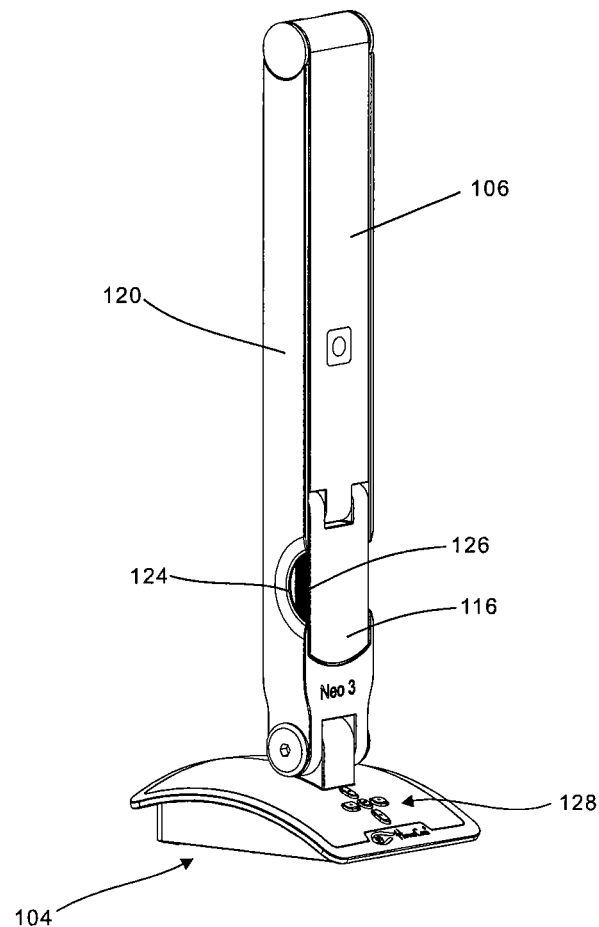
FIG. 2 shows an arm and a hand of the embodiment in a concealed configuration.

As shown in FIG. 2, the imaging device 102 is foldable so that it can be stored more easily. When the imaging device 102 is in a folded configuration, the arm stem 120 almost completely conceals the arm 106 and hand 116. As shown in FIGS. 1 and 2, the stem 120 includes at least one notch 124 on either side thereof. The notch 124 provides easier access to the arm 106 and the hand 116. Also, ridges 126 are provided on the hand 116 to provide a better grip for a person extracting the arm 106 and hand 116 from the stem 120.

The base 104 includes a control panel 128. The control panel 128 shown is mechanical; however, it can also be electrical, optical or acoustic via the implementation of a touch screen, a laser scanner or voice recognition. The control panel 128 provides a user access to such things as zoom, panning, color, image capture, video, snapshot, etc.

Figure 3:
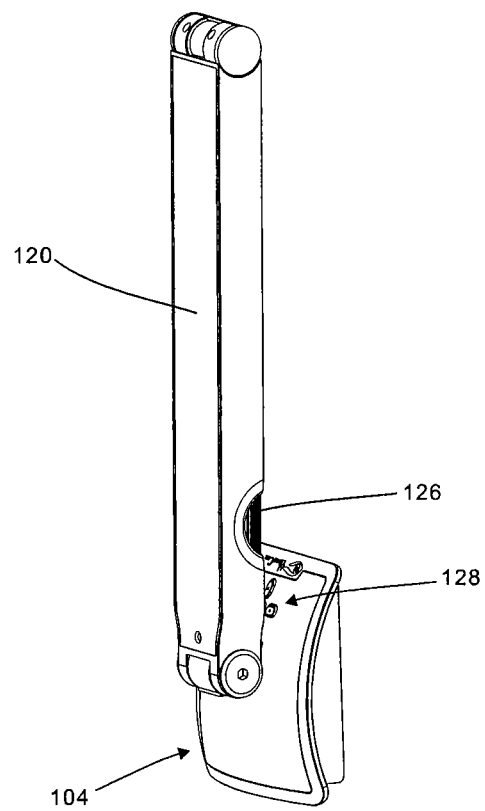
FIG. 3 shows a foot of the embodiment in an alternate configuration.

As shown in FIG. 3, arm 106 is rotatably connected to the stem 120. The arm shown in FIG. 3 is rotatable about a single axis; however, a person having ordinary skill in the art will understand that the arm 106 can be configured to be rotatable in three directions. As explained above, when not being used, the arm 106 is concealable in the stem 120. Also, the stem 120 is rotatable about bottom portion 138.

Figure 4:
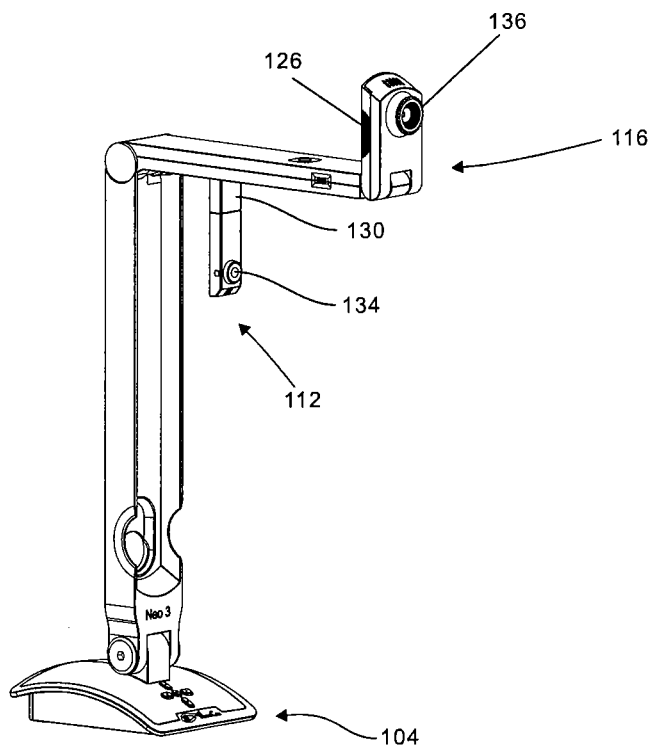
FIG. 4 shows an elongate flap of the embodiment in extended configuration.

As can be seen in FIG. 4, elongate flap 112 is rotatably connected to the arm 106. When not in use, the elongate flap 112 can be folded to a position within the arm 106 and concealed from view. The elongate flap 112 has a trunk 130 and a turret 132 in which a lens 134 is positioned. The turret 132 is rotatable about at least one axis.

The hand 116 is rotatably positioned on an end of the arm 106. The hand 116 includes at least one lens 136 therein. The hand 116 is shown in FIG. 4 to be rotatable about a single axis; however, the hand 116 is not limited to rotation about only a single axis. The hand 116 is configurable so that it is always positioned parallel to the bottom of the base 104. As such, a page to be scanned that is resting on the same surface of the base 104 will be parallel with the hand 116. A person having ordinary skill in the art will understand that maintaining a parallel relationship between the hand 116 and the base 104 can be accomplished using a four bar linkage an electronic leveling means, a motorized mechanism coupled to a signal for coordinating the level of the hand 116 and the base 104, or through any other means.

In this embodiment, the lenses 134 and 136 are not limited to being positioned on the elongate flap 112 and the hand 116. Rather, the lenses 134 and 136 (or any other type of image capturing device) can be positioned on the bottom portion 138, the stem 120, the elongate flap 112 and/or on the hand 116. The lenses 134 and 136 capture and project an image of a subject onto a photosensitive material (not shown). The photosensitive material is a photo-electrode or some other device that can convert light into an electrical signal.

Also, if desired, there is no need for a focus function because the lenses used in the imaging device have an infinite focal length similar to the type of lens used in a camera phone. Because the lenses have an infinite focal length, the potential for any type of object that can be imaged is limitless. For example, a document having only two dimensions can be imaged or a person's face or any other type of three-dimensional object can be imaged. This ability is useful in the present imaging device because the lens 134 that is positioned in the elongate flap 112 is intended to capture an image of the person using the imaging device. The infinite focal length lens makes it possible for a person to move toward and away from the lens without the imaging device having to adjust the lens to keep the object in focus.

A digital signal processor (DSP) is used to maintain the sharpness of the image. The DSP continuously updates the analog signal entering the device. The DSP allows for error detection and data compression for transmission to remote locations. The digital signal processor is especially beneficial in real-time image capturing applications.

Figure 5:
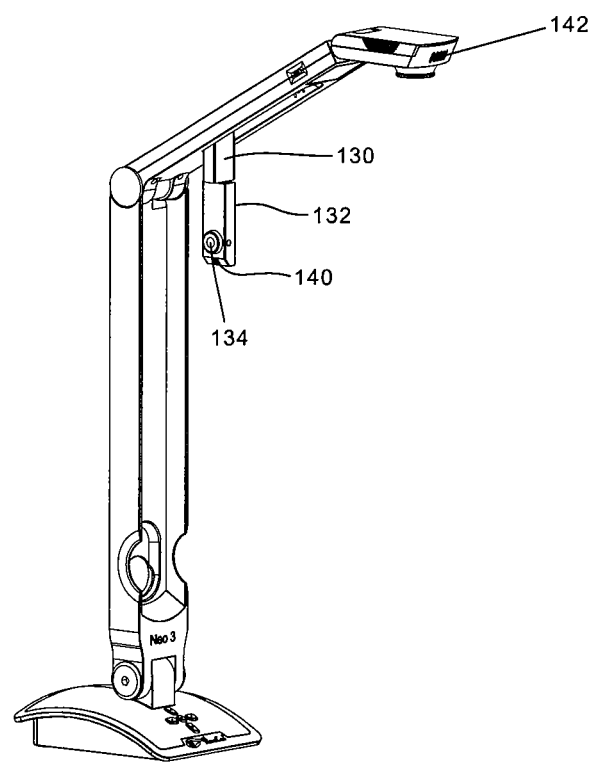
FIG. 5 shows a turret of the elongate flap in a rotated configuration.

As shown in FIG. 5, extra features for the imaging device include a sound recording mechanism 140 such as a microphone or other auditory pick up and a sound projection mechanism such as a speaker or a mechanism for visualizing sound such as a graphic equalizer. An optional light source 142 can be provided to aid in illumination of the subject.

The first and second lenses 134 and 136, regardless of their position on the image capturing device 102, are selectively operable. Thus, at least one image is captured using the hand optics 136 or the elongate flap optics 134. These images can be electronically saved on a drive in separate files or combined and saved within the same file. Saving the images in the same file allows the images to be easily recalled so that the images can be viewed as a joint image on a bifurcated screen. The imaging device can be set so that the screen is bifurcated vertically or horizontally or configured as a "picture-in-picture" type of screen. Thus, the imaging device acts as kind of an automatic editing device.

Once an image is scanned, the imaging device can store the image in a non-volatile memory. Long term storage will be done on either an external hard drive or on an internal drive, if the imaging device is so equipped. The imaging device can be equipped with Bluetooth so that it can wirelessly connect with various other devices. Through a wireless connection, the images can be saved on hard drives within the other devices.

The imaging device can connect to the internet if necessary. That way, a user can send images to remote locations without the need to connect to a PC or MAC computer. A person can simply use the controller 128 to connect to the internet and send an image directly from the imaging device. Preferably, internet access would be wireless so that the need for an Ethernet cable is eliminated. However, the imaging device is also equipped with various outputs such as Ethernet, USB, micro USB, etc. If so desired, the imaging device is equipped with Bluetooth for wireless integration with a PC or MAC.

Bluetooth capability is desirable to connect the imaging device to a printer, laptop, handheld phone or personal data assistant. The imaging device can scan a document or object and immediately send the image to a printer or it can send the image to a person's phone as a multimedia message service (MMS) message. Also, control of the imaging device can be through the use of a handheld phone or laptop. For example, in the case of an Apple® iPhone®, an app containing control software would be downloaded to the iPhone and then the imaging device would be controlled directly from the person's phone.

In operation, at a first step, a person identifies one or two targets to be imaged. For the elongate flap imager, a centered image confirmation tool (not shown) can be added to the image processing device. At a second step, the person centers his own image using the centered image confirmation tool. This tool is a mirror, a screen positioned in the base 104 or a video screen integrated into the control panel 128 on the base 104. If doing live (real-time) video, the person then conducts a lesson/lecture. At a third step, the still and video images are recorded and stored on a drive either internally or externally. If sending snapshot images to a remote location, the person activates a still image photo option using the control panel 128 (or control screen, if so equipped). At a fourth step, the image is then recorded using digital signal processing methods. Once the image is recorded, a person can then decide whether she wants to save the image, manipulate the image to merge it with a second (simultaneously) recorded image, crop, or otherwise edit the image.

The present system is optimally used by a lecturer or teacher who needs both broader projection of her own image as well as broader projection of a document being written. One benefit is that optimal use of the internet through social networking, a dedicated website, etc. can be made for students who cannot attend a lecture. Similarly, the imaging device can be used along with software such as Skype for real-time online lectures. Due to the limitations of software such as Skype, however, a transmission would have to be limited to a single image view with some sort of toggling capability. An online social network type of system provides a friendly environment for the present imaging device. A student or audience member can log into a social network and view live or recorded presentations (of both the lecturer/teacher and a document).

A display device, an internal non-transitory hard drive, a processor and a motion detection unit can be added to the device. The image display device can display images that are obtained from the image capturing devices, the hard drive, a remote source or any combination thereof. The imaging device is selectively operable with a PC and a Mac. However, the imaging device is not a dumb peripheral, i.e., it is not limited to use with an external processor. It can output video to projector without a PC or a MAC. At the same time the imaging device can output a signal converted to digital output. Also, the image display device can be a touch sensitive display screen or a projector for emitting images onto a large surface. The motion sensing unit would be to wake up the device if it is equipped with a "sleep" power saving function.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

I claim:

1. An imaging device comprising
   an elongate base, an arm pivotally attached at one end thereof to an end of the elongate base, and an elongate flap pivotally attached to the arm; and
   a plurality of image capture devices embedded in at least one of the elongate base, the arm and the flap;
   wherein at least one of the plurality of image capture devices is a first optic that is embedded in the elongate flap.

2. The imaging device as recited in claim 1 further comprising a hand pivotally connected to a second end of the arm.

3. The imaging device as recited in claim 2 wherein a second optic is embedded in the arm.

4. The imaging device as recited in claim 2 wherein a second optic is embedded in the hand.

5. An image capturing and projection system comprising
   a housing comprised of a base and a linkage having a plurality of elongate sections;
   a light capture mechanism for simultaneously capturing a first image and a second image, the light capture mechanism contained within at least one of the plurality of elongate sections and comprising a first lens and a second lens;
   an image display mechanism for displaying the simultaneously captured first and second images; and
   a base and an arm connected to the base wherein the first lens is embedded in the arm and wherein the second lens is at least partially embedded in a pivotable protrusion on the arm, the pivotable protrusion located in a midpoint of the arm.

* * * * *